United States Patent [19]

Kanno et al.

[11] Patent Number: 4,528,937
[45] Date of Patent: Jul. 16, 1985

[54] DEVICE FOR FORMING A DEVELOPER FILM

[75] Inventors: Fuchio Kanno, Yokohama; Koji Sakamoto, Tokyo; Kazuo Kobayashi, Kawasaki; Wataru Yasuda, Yokohama; Hiromi Ogiyama, Tokyo, all of Japan

[73] Assignee: Ricoh Co., Ltd., Japan

[21] Appl. No.: 674,037

[22] Filed: Nov. 23, 1984

[30] Foreign Application Priority Data

Nov. 24, 1983 [JP] Japan .................................. 58-219605

[51] Int. Cl.³ ............................................. G03G 15/09
[52] U.S. Cl. .................................. 118/657; 355/3 DD
[58] Field of Search ...................... 118/657; 355/3 DD Primary Examiner—Bernard D. Pianalto
Attorney, Agent, or Firm—Guy W. Shoup

[57] ABSTRACT

A device for forming a toner film for use in developing an electrostatic latent image on an image bearing member, such as photosensitive member, is provided. A developing sleeve is rotatably provided and a magnet roll is also rotatably provided inside of the sleeve for magnetically attracting a blade of magnetic material to the outer peripheral surface of the sleeve thereby causing the toner carried on the sleeve to be formed into a film of desired thickness and charge. The magnet roll is formed with a plurality of magnetic poles elongated axially and arranged along the periphery of the roll in alternating polarities. Thus, the magnetic attractive force applied by the magnet roll to the blade changes periodically. In the present invention, the frequency of alternating magnetic field applied to the blade is set to be larger than the first order resonant frequency of the blade, thereby allowing to maintain the applied magnetic force as constant as possible.

7 Claims, 8 Drawing Figures

DEVICE FOR FORMING A DEVELOPER FILM

BACKGROUND OF THE INVENTION

1. Field of the Invention

This invention generally relates to a device for developing an electrostatic latent image formed on an imaging member by application of a thin film of developer charged to a predetermined polarity, and, in particular, to a device for forming a developer film for use in developing such an electrostatic latent image. More specifically, the present invention is concerned with a device for forming a film of magnetically attractable toner to be used in developing an electrostatic latent image formed on an image bearing member.

2. Description of the Prior Art

In a developing device employing magnetically attractable toner, or so-called single component toner, it is required to form a thin film, uniform in thickness, of such toner which is sufficiently charged to a predetermined polarity. For this reason, as shown in FIG. 1, inside of a developing sleeve 2, which is driven to rotate counterclockwise, there is disposed a magnet roll 3, which is also driven to rotate counterclockwise in the illustrated example, and magnetically attractable toner 1 is carried on the outer peripheral surface of the developing sleeve 2 as attracted thereto by the magnetic forces emanating from the magnet roll 3. In this structure, there is also provided a blade 4, which is comprised of an elastic, magnetic material, with its free end pressed against the outer peripheral surface of the developing sleeve 2 due to magnetic attractive forces applied by the magnet roll 3. Thus, when the toner 1 carried on the developing sleeve 2 is brought to a gap P defined between the free end of the blade 4 and the outer peripheral surface of sleeve 2, the toner 1 becomes pressed between the blade 4 and the sleeve 2 thereby causing the toner 1 to be formed into a thin film uniform in thickness. At the same time, since the toner 1 is subjected to friction against the blade 4 and the sleeve 2, the toner 1 becomes triboelectrically charged to a predetermined polarity as being formed into a thin film.

In this case, the pressing force between the blade 4 and the sleeve 2 fluctuates cyclically with the rotation of the magnet roll 3. Under the condition, if the pressing force increases excessively for some reason, then there is produced an significantly large frictional force which could then suddenly increase the temperature of the toner 1 between the blade 4 and the sleeve 2. In this case, the toner 1 thus heated could melt and become fixedly attached to the blade 4. If the toner 1 is fixedly attached locally on the blade 4, it is impossible to form a thin film of toner uniform in thickness and, often times, streaks are formed in the resulting thin film of toner. This is disadvantageous because such streaks will appear in a developed image thereby impairing the developing performance.

SUMMARY OF THE INVENTION

It is therefore a primary object of the present invention to obviate the disadvantages of the prior art as described above and to provide an improved developing device for developing an electrostatic latent image. Another object of the present invention is to provide an improved developing device for developing an electrostatic latent image by applying the so-called single component developer or magnetically attractable developer.

A further object of the present invention is to provide an improved device for forming a developer film for use in developing an electrostatic latent image, which is capable of forming the developer film uniform in thickness at all times.

A still further object of the present invention is to provide an improved device for forming a developer film stable and reliable in film forming operation.

A still further object of the present invention is to provide an improved device capable of forming a developer film uniform in charging and thickness for an extended period of time.

A still further object of the present invention is to provide an improved film forming device simple in structure and easy in maintenance.

Other objects, advantages and novel features of the present invention will become apparent from the following detailed description of the invention when considered in conjunction with the accompanying drawings.

DESCRIPTION OF THE PREFERRED EMBODIMENTS

Figure 1:
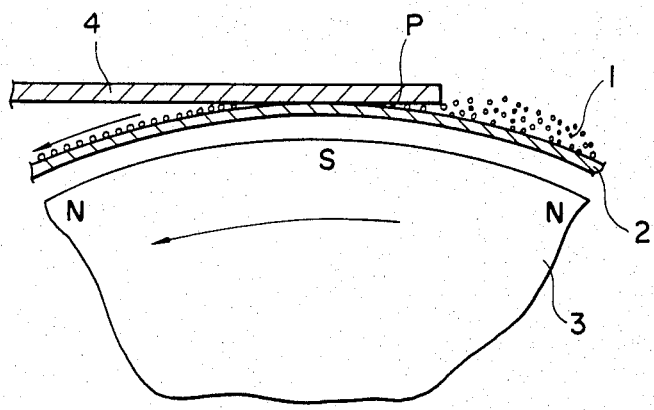
FIG. 1 is a schematic illustration showing the structure of a developing device employing the so-called single component developer.

In the case where the toner 1 is to be electrically charged as scrubbed between the blade 4 and the sleeve 2 as described above, the toner 1 may become locally stuck to the blade 4 by melting mainly due to heat produced by friction among the toner 1, blade 4 and sleeve 2 in the vicinity of contact point between the blade 4 and the sleeve 2. In this regard, the following thermal model may be established. That is, in the structure shown in FIG. 1, designating the relative velocity between the toner 1 and the blade 4 by v (which is approximately equal to the peripheral speed of the sleeve 2), the pressure force per unit area received by the blade 4 from the toner 1 by N, and the coefficient of kinetic friction determined by the surface condition of the blade 4 and the toner by $\mu$, the amount of heat J produced per unit area and per unit time in the vicinity of contact point P between the blade 4 and the toner 1 can be expressed by the following equation.

$$J \propto \mu \cdot v \cdot N \tag{1}$$

Thus, in order to properly control the amount of produced heat J, it is only necessary to control one or more of the three factors $\mu$, v and N in the above expression. Here, since v may be determined by the rotational speed of a driving source, such as a motor, of the sleeve 2 and μ may be determined by a particular combination of materials which form the blade 4 and the toner 1, respectively, these two factors may be properly determined at optimum with ease. However, in the case where use is made of a fluctuating or alternating magnetic field such as the one produced by the magnet roll 3, the pressing force applied by the blade 4 changes periodically as expressed by the following equation.

$$N = \sum_{k=1}^{n} A_k \cdot \cos(\omega_k \cdot t) + B > 0 \qquad (2)$$

In the above equation (2), $A_k$ is an amplitude, $\omega_k$ is frequency, and B is a constant term which indicates a d.c. component of magnetic pressing force N. As is seen from the above equation (2), the pressing force N is a combination of various force components. However, since the main component is the fundamental component for k=1, the following approximation holds generally true.

$$N \approx A_1 \cdot \cos(\omega_1 \cdot t) + B \qquad (3)$$

Figure 2:
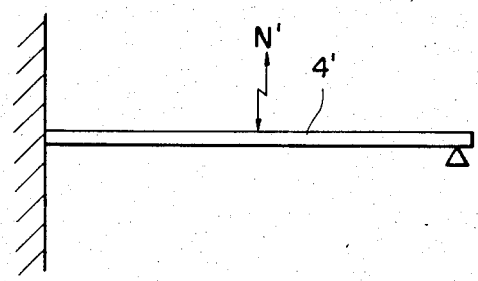
FIG. 2 is a schematic illustration showing a beam which is dynamically equivalent to the blade 4 shown in FIG. 1.
Figure 3:
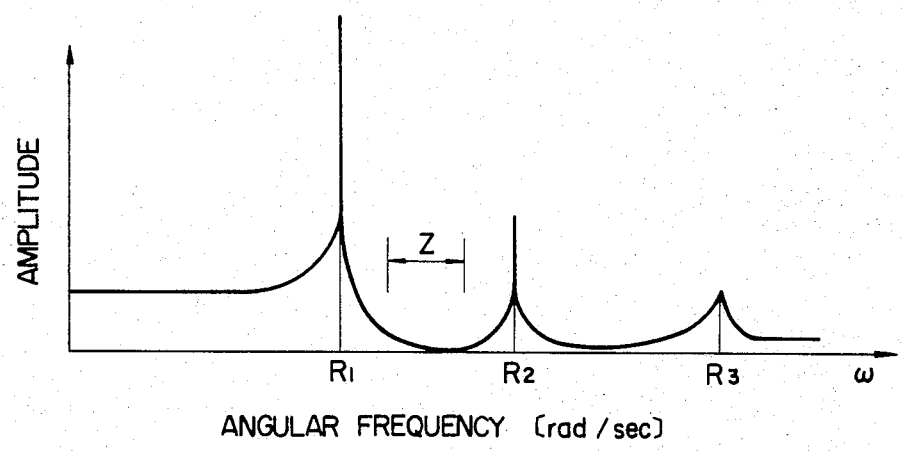
FIG. 3 is a graph showing the relation between the angular frequency of alternating magnetic field produced by the magnet roll 3 and the amplitude or level of pressing force present between the blade 4 and the sleeve 2.

The dynamic condition present in the structure shown in FIG. 1 may be equivalently modeled as a beam 4' as shown in FIG. 2. In FIG. 2, the beam 4' is fixedly supported at its left-hand end and freely supported at its right-hand end. If a periodic external force N' is applied to the beam 4', there are produced various modes of vibration in the beam 4', and, in the linear region, the response characteristic curve may be obtained as shown in the graph of FIG. 3, in which the ordinate indicates the amplitude of vibration and the abscissa indicates the angular frequency in rad/sec. Since the beam 4' and periodic external force N' in the mode of FIG. 2 correspond to the blade 4 and magnetic force of magnet roll 3 in the structure of FIG. 1, respectively, the response characteristic curve shown in the graph of FIG. 3 may be considered to indicate the relation between the amplitude $A_1$ of blade 4 and the frequency $\omega_1$ of alternating magnetic field produced by the magnet roll 3.

Of importance, as shown in the graph of FIG. 3, there is present a region Z, in which the amplitude is extremely small, in the region of frequency above the fundamental resonant frequency $R_1$, in particular between the fundamental or first order resonant frequency $R_1$ and the second order resonant frequency $R_2$. As may be easily understood, such a resonant condition is obtained if the natural frequency of the blade 4 matches the frequency of alternating magnetic field applied by the magnet roll 3. If the frequency is set to be within this region Z, the amplitude $A_1$ becomes extremely small so that virtually no vibration is induced in the blade 4. In other words, the pressing force N acting on the blade 4 is predominantly determined by the constant component B. Under the condition, it is preferable to set the frequency of alternating magnetic field to be larger than the first order resonant frequency $R_1$, and, in the most preferred embodiment, the frequency of alternating magnetic field produced by the magnet roll 3 should be so set to be slightly larger than the first order resonant frequency $R_1$ but slightly smaller than the second order resonant frequency $R_2$. As indicated in the graph of FIG. 3, as long as the frequency of alternating magnetic field produced by the magnet roll 3 to be applied to the blade 4 is set larger than the first order resonant frequency $R_1$ of the blade 4, the frequency of alternating magnetic field may be set to range between the two adjacent resonant frequencies, excluding the resonant frequencies and their vicinities.

Figure 4:
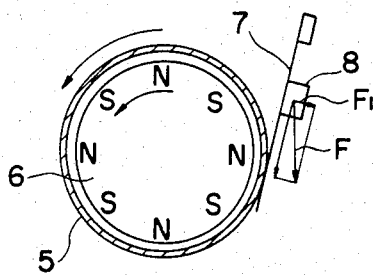
FIGS. 4 through 6 are schematic illustrations showing several embodiments of the present invention.

FIG. 4 shows one embodiment of the present invention constructed on the basis of the above-described principle of the present invention. As shown, a cylindrical sleeve 5 and a magnet roll 6 are coaxially provided and they are driven to rotate in the same direction, counterclockwise in the illustrated example. The magnet roll 6 is formed with magnetic poles, eight in total in the illustrated example, which are arranged as equally spaced apart from one another along the periphery of the magnet roll 6 with alternating polarities. Also provided is a blade 7 comprised of an elastic, magnetic material, and the blade 7 has its base end fixedly supported at a stationary object (not shown) and its free end pressed against and in sliding contact with the peripheral outer surface of the sleeve 5 as attracted by the magnetic force applied by the magnet roll 6.

In the case where use is made of a magnet roll having a relatively small number of magnetic poles as in the present embodiment, in which eight magnetic poles of both polarities are formed in the magnet roll 6, it is generally required to rotate the magnet roll 6 at high speed in order to set the frequency of alternating pressing force N to range within the above-described proper frequency region Z. However, it is not always advantageous to operate the magnet roll 6 at high speed particularly from the viewpoint of running cost and durability. Thus, in the present embodiment, a weight 8 is mounted on the blade 7 to lower the level of natural frequency of the blade 7 thereby causing to decrease the level of first order resonant frequency $R_1$. With this structure, the frequency of alternating pressing force N may be easily set in the proper region Z thereby allowing to keep the amplitude of alternating pressing force N smaller in level. In addition, with the provision of the weight 8, the constant component B in the equation (3) may also be made smaller in value, which also contributes to make the pressing force N even more smaller.

In the structure shown in FIG. 4, the weight 8 is so provided that the gravity force F acting on the weight 8 has a force component $F_1$, which is directed normal to the blade 7 and which acts to tend to move the blade 7 separated away from the sleeve 5. Because of such an arrangement, the constant component B in the equation (3) becomes smaller. It is to be noted however that the pressing force N cannot be made smaller without limitation. The pressing force N must be large enough to form a thin film of toner 1 having a desired thickness and charge. As described above, in the present embodiment, the blade 7 itself is so structured or the weight 8 is mounted on the blade 7 to satisfy the condition that the frequency of alternating pressing force N is set within the proper region Z thereby making the level of fluctuation applied by the magnet roll 6 to the blade 7 to be significantly smaller. Thus, the pressing force acting between the blade 7 and the sleeve 5 remains virtually at constant and low in level, which contributes to keep the amount of heat production low in level thereby allowing to prevent the toner 1 from being stuck to the blade 7.

Figure 5:
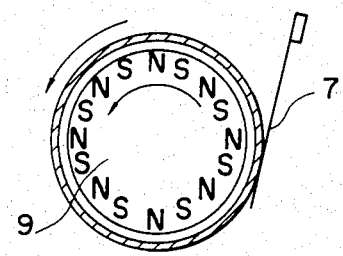

FIG. 5 shows another embodiment of the present invention in which provision is made of a magnet roll 9 having an increased number of magnetic poles arranged along the periphery in alternating polarities. With the provision of such an increased number of magnetic poles, the frequency of alternating magnetic field can be increased for a given size and r.p.m. of magnet roll, so that the frequency of alternating pressing force N may be set in the proper range Z without requiring additional modifications. This embodiment is particularly advantageous because the frequency of alternating pressing force N can be increased without increasing the rotational speed of the magnet roll 9.

Figure 6:
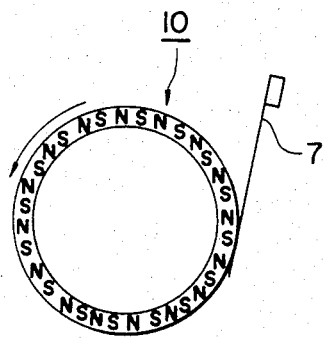

FIG. 6 shows a further embodiment of the present invention in which use is made of a developing sleeve 10 which is comprised of a magnetizable material at least partly and which is magnetized in a fine pattern. Thus, the developing sleeve 10 possesses not only a function of carrying the magnetic toner 1 thereon but also a function of creating an attractive magnetic field for causing the blade 7 to be pressed against the sleeve 10. In this case, the pitch and intensity of magnetization and the rotational speed of sleeve 10 can be selectively set from broader ranges, and, thus, conditions for preventing the occurrence of toner sticking may be set relatively easily.

Figure 7A:
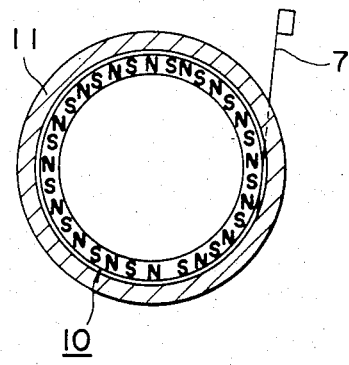
FIGS. 7a and 7b are schematic illustrations showing a further embodiment of the present invention.
Figure 7B:
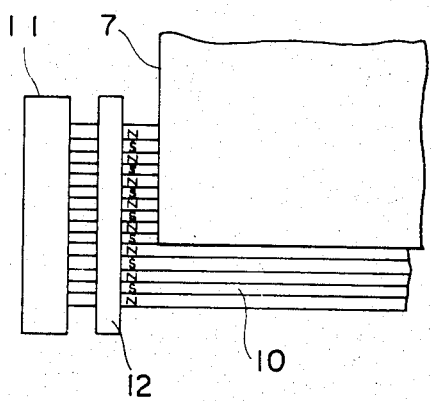

FIGS. 7a and 7b show a still further embodiment of the present invention, which may be constructed as modified from the embodiment shown in FIG. 6. That is, in the present embodiment, at each end of the developing sleeve 10 formed with a fine magnetic pattern, as magnetized along the periphery in the form of stripes in the illustrated example, there is disposed a rotating magnetic field generating mechanism 11 which applies the rotating magnetic field to the corresponding end portion of the sleeve 10 thereby driving to rotate the sleeve 10 as if it were a rotor of a motor. Also provided is a magnetic shielding ring 12 which prevents the rotating magnetic field generated by the mechanism 11 from being applied to the blade 7. Such a structure is particularly advantageous because the sleeve 10 can be driven to rotate smoothly as well as quietly and it also contributes to reduce the level of vibration induced in the blade 7, which, in turn, contributes to prevent the toner 1 from being stuck to the blade 7.

It should further be noted that the resonant frequency conditions of blade 7 also change subject to various other factors, including spring constant, density and magnetic characteristics, it is preferable to design the present device also by taking into consideration of all of these factors as well in setting the pressing force N of blade at optimum condition.

While the above provides a full and complete disclosure of the preferred embodiments of the present invention, various modifications, alternate constructions and equivalents may be employed without departing from the true spirit and scope of the invention. For example, the magnet roll and sleeve may be driven to rotate in opposite directions from each other, or only the magnet roll may be driven to rotate while keeping the sleeve non-rotating. Therefore, the above description and illustration should not be construed as limiting the scope of the invention, which is defined by the appended claims.

What is claimed is:

1. A device for forming a film of developer, comprising:
    transporting means for transporting a developer as carried thereon along a predetermined path;
    film forming means partly pressed against said transporting means for forming said developer carried on said transporting means into a film of desired thickness, said film forming means being comprised of a magnetic material at least partly; and
    applying means for applying an alternating magnetic force at least to said film forming means thereby causing said film forming means to be attracted to said transporting means magnetically, whereby the frequency of said alternating magnetic field is set higher than the first order resonant frequency of said film forming means.

2. The device of claim 1 wherein the frequency of said alternating magnetic field is set in a region which is defined to be slightly larger than the first order resonant frequency of said film forming means and slightly smaller than the second order resonant frequency of said film forming means.

3. The device of claim 1 wherein said film forming means includes a blade having a base end which is fixedly supported and a free end which is opposite to said base end and pressed against said transporting means and a weight mounted on said blade such that said weight applying a force to said blade in the direction of separating away from said transporting means.

4. The device of claim 1 wherein said transporting means includes a rotatably supported sleeve and said applying means includes a magnet roll disposed inside of said sleeve and formed with a number of magnetic poles elongated axially and arranged along the periphery of said magnet roll in alternating polarities at a small pitch.

5. The device of claim 1 wherein said transporting means is comprised of a magnetizable material at least partly whereby said applying means is formed by magnetizing said transporting means in a desired pattern.

6. The device of claim 5 wherein said transporting means includes a rotatably supported sleeve which is comprised of a magnetizable material at least partly and magnetized in a desired pattern, and said device further comprising generating means for generating a rotating magnetic field to be applied to at least one end of said sleeve for rotation thereof.

7. The device of claim 6 further comprising magnetic shielding means disposed adjacent to said generating means for preventing said rotating magnetic field from being applied to said film forming means.

* * * * *